3,313,644
METHOD OF DECORATING SEMICRYSTALLINE BODIES
Joseph W. Morrissey, Corning, N.Y., assignor to Corning Glass Works, Corning, N.Y., a corporation of New York
No Drawing. Filed Nov. 19, 1964, Ser. No. 414,051
6 Claims. (Cl. 117—37)

This application is a continuation-in-part of my co-pending application Serial No. 813,343, filed May 15, 1959 now abandoned.

This invention relates generally to the manufacture of crystalline or semicrystalline ceramic bodies by melting a batch, forming therefrom a glass body and thereafter heat treating it at controlled temperatures to crystallize it without substantial change of shape, the crystals being microscopic in size and random in orientation, the residual glass, if any, forming a matrix in which the crystals are substantially uniformly dispersed, the proportion of crystals to matrix in that event being much higher than that which occurs in "opal glasses" and the body exhibiting physical properties, such as linear thermal expansion coefficient, density, mechanical strength, etc., differing substantially from such properties of a "glass" of the same chemical composition.

The primary object of the invention is to provide a method of coloring or decorating such bodies by forming a coloration within and below the surface of the body.

Another object is to color or decorate such bodies having thermal expansion coefficients (0 to $30 \times 10^{-7}$ per ° C.) so far below the expansion coefficients of conventional glazes and enamels as to make the use of such glazes and enamels impracticable.

Another object is to provide new crystalline or semicrystalline bodies resulting from such method.

It is well-known in the art to color or decorate ceramic bodies with glazes. A glaze is defined as a ceramic coating matured to the glassy state on a formed ceramic article, or the material or mixture from which the coating is made. (Ceramic Glossary published by the American Ceramic Society, 1963.) A glaze, then, is a glassy composition containing low melting compounds or fluxes such as the alkali metal oxides, boric oxide, and lead oxide. In other words, a glaze is a ceramic mixture which, when fired, melts and flows at temperatures below that of the body to be covered therewith. Semicrystalline bodies of the type described above, or glass-ceramic bodies as they are frequently termed, may have expansion coefficients so low as to be less than zero or as high as $300 \times 10^{-7}$ per ° C., depending upon their compositions. While such bodies that have expansion coefficients in the neighborhood 50 to $100 \times 10^{-7}$ per ° C. can be successfully decorated with conventional glazes and enamels, such decorations are superficial and outside the surface of the body where they are too susceptible to attack and may be removed by abrasion and chemical reagents such as detergents, vinegar, etc. Semicrystalline bodies having low expansion coefficients (0 to $30 \times 10^{-7}$ per ° C.), which are particularly suitable for culinary ware on account of their thermal shock resistance, do not lend themselves to practicable decoration with conventional glazes and enamels on account of the mismatch of expansion coefficients which may cause crazing. A method of providing such semicrystalline bodies with wear resistant and chemical resistant colors and decorations is, therefore, much to be desired.

I have now discovered a method of coloring or decorating semicrystalline bodies generally whereby the coloration or decoration is within and below the surface of the body and does not establish undesirable stresses in the surface.

Broadly the new method comprises applying to a selected portion of the body a decorating composition containing at least one glass-coloring agent selected from the class consisting of iron, cobalt, nickel, and compounds thereof, and thereafter heating the body between about 900° C., and 1175° C. for about 1 to 4 hours to color said portion within and below its surface. While the elements iron, cobalt, and nickel, per se, under most conditions, will produce some coloration in the bodies, it is not as satisfactory as when the oxides or other compounds of these elements are used and the residue may be difficult or impossible to remove from the surface even when inert diluents are present. The glass-coloring agents, vanadium, manganese, selenium, tellurium, cerium, uranium and their compounds do not produce a satisfactory coloration in such semicrystalline bodies. Chromium and its compounds individually also do not produce substantial coloration in such bodies; but compounds of chromium, when used in combination with compounds of iron, cobalt or nickel and particularly in the presence of a fluoride, tend to impart a greenish tint to the resultant color.

In carrying out the invention the decorating composition preferably should be applied to the glass body before it has been crystallized, because crystallization of the glass and coloration of the semicrystalline body are thereby accomplished at the same time. As a maximum, the depth of coloration, particularly that of cobalt, may amount to as much as 1 mm. or more. The decorating composition may, if desired, be applied to the semicrystalline body per se by first heat treating the glass body in the usual manner to crystallize it, cooling the semicrystalline product, then applying the decorating composition thereto and thereafter heating the coated semicrystalline body between about 900° C. and about 1175° C. As is pointed out above, the added expense of a second heat treatment is a disadvantage when the decorating composition is applied to the semicrystalline body per se.

The glass coloring agents which are utilized in the new method of the invention have never been known to take part in an ionic exchange with alkali metal of the type so well known in the coloring or "staining" of alkali-containing glass by copper and silver; but the new method is effective both for semicrystalline compositions which are free of alkali metal oxides and for those which contain an alkali metal oxide. Moreover the characteristic coloration below the surface by such coloring agents, which is produced by the new method occurs only in such semicrystalline bodies. At best, the method will produce only a slight superficial surface coloration of a glass body.

An example of conventional glazes which have been found suitable for decorating glasses is disclosed in United States Patent No. 1,862,366 which describes a method for coloring fused quartz, a glass, with a cobalt oxide-containing composition. In the practice described therein, a mixture of lead oxide, silica, and cobalt oxide is suspended in glycerine and then placed on a previously etched portion of the fused quartz. The coated body is then placed in a flame and heated slightly to evaporate the glycerine. Finally, the body with the dried coating thereon is heated in the flame to redness to fuse the coloring mixture onto the surface thereof. It will be appreciated that the lead oxide behaves as a flux therein and, thus, the decoration provided thereby is in reality a surface glaze. As such, when it is applied to an unetched glass surface, the colored coating is raised from the surface and prominently available for attack by mechanical abrasion and chemical reagents. The superficial decoration is easily distorted and removed upon slight abrasion. When this glaze is fired upon semicrystalline bodies, a similar situation obtains. The raised coloration is susceptible to mechanical abrasion and, therefore, the hue thereof will not remain constant as is the case with the stain of the new method.

It is believed that coloration by the new method is the result of a solid state reaction which occurs only at elevated temperatures whereby a coloring atom or ion of one or more of the recited coloring agents enters the lattice of a crystal of the semicrystalline body and combines therewith during the formation and/or growth of such crystal and particularly at temperatures at which the crystal normally undergoes a transition from one modification to another. Such solid state reactions are known in the formation of some spinels, such as cobalt aluminate ($Co_3Al_2O_7$). Such reactions are referred to in the book entitled, "Einführung in die Festkoerperchemie" by J. A. Hedval.

The above recited glass coloring agents may be used in concentrated form or they may be diluted by mixing them with an inert powder which does not react with the semicrystalline body, such as $TiO_2$, $Al_2O_3$, MgO, ZnO, sillimanite, $ZrO_2$, $SiO_2$, etc. The use of such a diluent improved the uniformity of the resultant coloration particularly when the coloring agent included cobalt or its compounds. Uniform coloration may be obtained with amounts of diluent up to about 90% by weight but the intensity or saturation of the color diminishes with high percentages of diluent and coloration becomes practically ineffective beyond this amount. Since the coloration is produced by the atoms or ions of the recited elements per se, any compound thereof may be used with good results.

The coloring agent may be applied to the body to be colored by any suitable means or procedure which produces an even uniform coating, such as, spraying, brushing or silk screening. For this purpose the decorating composition and diluent, if any, together with an appropriate amount of a suitable vehicle, such as water and alcohol or squeegee oil, if the silk screen method is to be used, are ground together and/or intimately mixed, preferably by means of a ball mill. To improve adhesion of the coating before the heat treatment, about 10 wt. percent polyethylene glycol, molecular weight 6000, is mixed with the diluent. Since the earliest observed coloring reaction occurs at temperatures in the neighborhood of 900° C. and deformation becomes a problem above about 1175° C., the coated bodies in general should be heated between about 900° C. and about 1175° C. for about 1 to 4 hours or more to obtain satisfactory coloration.

In order to illustrate the scope of the invention, the new method was utilized to color semicrystalline bodies having the various compositions shown in Table I in weight percent on the oxide basis:

TABLE I

|  | A | B | C | D | E |
|---|---|---|---|---|---|
| $SiO_2$ | 71.0 | 69.2 | 67.9 | 71.0 | 56.6 |
| $Li_2O$ | 2.5 | 3.9 | 4.3 | 2.5 | --- |
| $Al_2O_3$ | 18.0 | 20.5 | 20.4 | 18.0 | 19.7 |
| $TiO_2$ | 4.5 | 5.4 | 5.4 | 4.5 | 9.0 |
| MgO | 3.0 | --- | --- | 4.0 | 14.7 |
| ZnO | 1.0 | --- | 1.0 | --- | --- |
| BaO | --- | 1.0 | 1.0 | --- | --- |

The batches of the above glasses were conventionally melted in crucibles, pots and tanks, depending upon the size of the melt, at about 1400° C. or above for at least 4 hours, more time being required with the larger melts. Melting was carried out under oxidizing conditions, which is preferable in order to avoid the fining difficulties commonly encountered in reduced melting. The conventional fining agent, $As_2O_3$, was used in the batches.

The results of experiments utilizing the new method applied to such glasses are set forth in Table II wherein are shown in consecutive columns the experiment number (Expt. No.), the composition of the body (Body Compn.), the coloring agent or agents in parts by weight (Color Agt.), the diluent, if any, in parts by weight and the resultant color produced respectively.

TABLE II

| Expt. No. | Body Compn. | Color Agt. (parts by wt.) | Diluent (parts by wt.) | Color |
|---|---|---|---|---|
| 1 | A | 30 $Co_3O_4$ | 70 $SiO_2$ | D. Blue. |
| 2 | A | 40 NiO | 60 sillimanite | Gray. |
| 3 | A | 10 $CoF_2$ | 80 $TiO_2$ | L. Blue. |
| 4 | A | 3 $Co_3O_4$, 5 $Fe_2O_3$ | 23 $TiO_2$ | Gray-Blue. |
| 5 | A | 15 NiO | 70 $TiO_2$, 15 $Cr_2O_3$ | L. Gray-Green. |
| 6 | A | 20 NiO | 80 $TiO_2$ | L. Gray. |
| 7 | A | 30 $Fe_2O_3$ | 70 $TiO_2$ | L. Yellow. |
| 8 | B | 20 $Co_3O_4$ | 80 $TiO_2$ | Purple. |
| 9 | C | 20 $Co_3O_4$ | 80 $TiO_2$ | Do. |
| 10 | D | 20 $Co_3O_4$ | 80 $TiO_2$ | Gray. |
| 11 | E | 20 $Co_3O_4$ | 80 $TiO_2$ | Blue. |
| 12 | A | $Ni(NO_3)_3 \cdot 6H_2O$ | --- | L. Green. |
| 13 | A | 10 $Co_3O_4$, 10 $Fe_2O_3$ | 10 $Cr_2O_3$ | D. Gray. |
| 14 | A | 3 $Co_3O_4$, 5 $Fe_2O_3$ | --- | Blue-Gray. |
| 15 | A | 5 $Co_3O_4$, 5 $CoF_2 \cdot 2H_2O$ | 90 $TiO_2$ | D. Blue. |
| 16 | A | 20 $Fe_2O_3$ | 80 MgO | L. Yellow. |
| 17 | A | $Fe_2O_3$ | --- | Red-Yellow. |
| 18 | A | 20 NiO | $Al_2O_3$ | L. Gray. |
| 19 | A | 5 $Co_3O_4$ | 50 $TiO_2$, 10 $CrF_3$ | Green. |
| 20 | A | 2 NiO | 80 $TiO_2$, 1 $Cr_2O_3$ | Green-Tan. |

Examples 5, 13, 19 and 20 illustrate the use of chromium compounds, which for convenience are listed as diluents since they have no substantial coloring effect by themselves, as is pointed out above.

The presence of substantial amounts of alkali metal compounds in the decorating composition is to be avoided on account of their fluxing action and tendency to roughen the surface of the body and/or to form a crust or residue which is difficult to remove. Hence, the complete absence of fluxes in the coloring compositions is to be preferred to assure a smooth stained surface but very minor amounts can be tolerated. The term "flux" as used here refers to a compound which is low melting in itself or which will react with the other ingredients of the decorating composition or even with the semicrystalline body to cause melting or flow.

I claim:

1. A method of coloring or decorating a crystalline or semicrystalline body made by the controlled crystallization by heat treatment of a glass body which comprises applying to a selected portion of the surface of the body a substantially flux-free decorating composition containing at least one coloring agent selected from the class consisting of iron, cobalt, nickel, and compounds thereof, and thereafter heating the body between about 900° C. and about 1175° C. for about 1 to 4 hours to cause said coloring agent to penetrate within and below the surface of said portion and enter into a solid state reaction therewith.

2. The method according to claim 1 wherein the decorating composition is applied to the glass body which is then heated between about 900° C. and 1150° C. for about 1 to 4 hours to simultaneously crystallize the glass body and color the semicrystalline body.

3. The method according to claim 1 wherein the decorating composition is applied to the semicrystalline body which is then heated between about 900° C. and 1150° C. for about 1 to 4 hours.

4. A method of coloring or decorating a crystalline or semicrystalline body made by the controlled crystallization by heat treatment of a glass body which comprises applying to a selected portion of the surface of the body a substantially flux-free decorating composition containing a combination of coloring agents consisting of at least one coloring agent selected from the class consisting of iron, cobalt, nickel, and compounds thereof in combination with compounds of chromium, and thereafter heating the body between about 900° C. and about 1175° C. for about 1 to 4 hours to cause said combination of coloring agents to penetrate within and below the surface of said portion and enter into a solid state reaction therewith.

5. A semicrystalline body of the type described having within and below its surface in selected areas a coloration imparted thereto by infusion of at least one coloring agent selected from the class consisting of iron, cobalt, nickel, and compounds thereof, said coloring agent entering into a solid state reaction therewith.

6. A semicrystalline body of the type described having within and below its surface in selected areas a coloration imparted thereto by infusion of a combination of coloring agents consisting of at least one coloring agent selected from the class consisting of iron, cobalt, nickel, and compounds thereof in combination with compounds of chromium, said combination of coloring agents entering into a solid state reaction therewith.

References Cited by the Examiner

UNITED STATES PATENTS

| 2,340,013 | 1/1944 | Nordberg et al. | 65—60 X |
| 2,658,837 | 11/1953 | Blackman | 65—60 X |
| 2,707,688 | 5/1955 | Blackman | 65—60 X |

FOREIGN PATENTS

| 167,681 | 3/1954 | Australia. |

DONALL H. SYLVESTER, *Primary Examiner.*

F. W. MIGA, *Assistant Examiner.*